F. S. BROWN.
OIL CUP.
APPLICATION FILED MAR. 26, 1912.
1,038,488.
Patented Sept. 10, 1912.
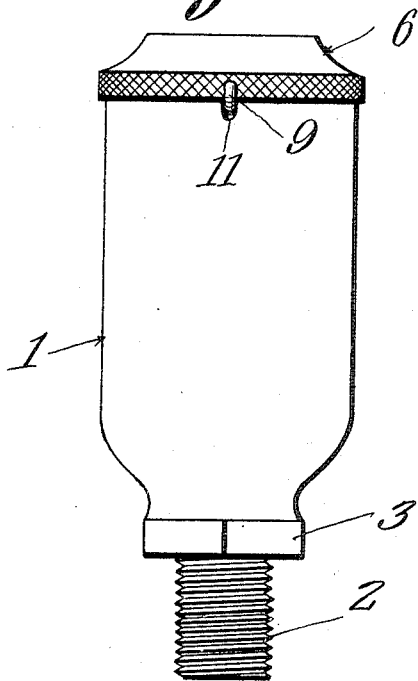
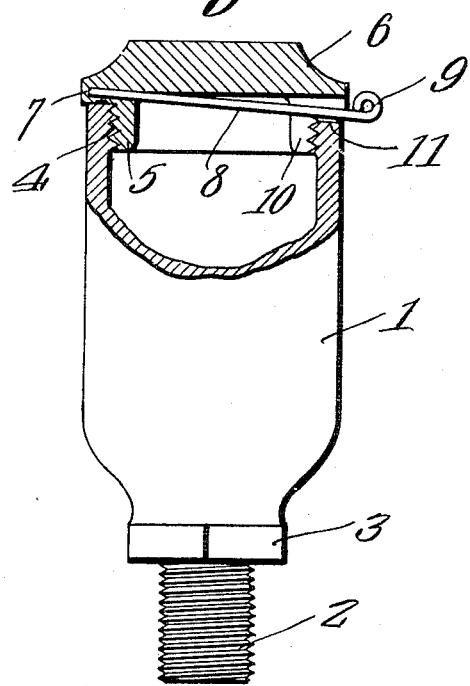
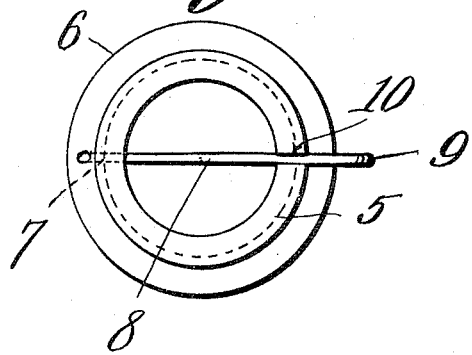
WITNESSES
F. B. Wooden.
E. Walton Brewington.
INVENTOR
Frank S. Brown,
By Henry J. Brewington,
Attorney

UNITED STATES PATENT OFFICE.

FRANK S. BROWN, OF BALTIMORE, MARYLAND.

OIL-CUP.

1,038,488. Specification of Letters Patent. Patented Sept. 10, 1912.

Application filed March 26, 1912. Serial No. 686,306.

*To all whom it may concern:*

Be it known that I, FRANK S. BROWN, a citizen of the United States, residing at Baltimore city, State of Maryland, have invented certain new and useful Improvements in Oil-Cups, of which the following is a specification.

My invention relates to improvements in oil cups such as are generally used for the purpose of holding oil for purposes of automaticaly lubricating parts of machinery, especially those parts which are in motion, without necessitating the stopping of the machinery for the purpose of lubrication which would otherwise become necessary, and has for its object to provide an oil cup of this character of such construction that the cap or cover may be readily and easily secured thereon and removed, and when secured thereon becomes securely locked and is incapable of being jarred loose or off the cup by the vibration occasioned by the running or motion of the machine or otherwise to which it is supplied, and is especially adapted for use on automobile engines and engines and parts used for similar purposes where more or less vibration is occasioned by the running of the machinery or the vehicle with which it is equipped.

With the foregoing and other objects in view which will presently appear, my invention consists in certain novel features of construction and combinations of parts which will be hereinafter described and pointed out in the claim.

Reference being had to the accompanying drawings, Figure 1 is a side elevation of the oil cup; Fig. 2 is a side elevation partly in section and viewed at right angles to Fig. 1 of the same, and Fig. 3 is a plan view of the under side of the cap or cover.

1 indicates the cup, made from any suitable material, preferably brass, and which may be of any suitable size or shape to meet the desired requirements, the cup being threaded at 2 for the purpose of securing it on the part of the machinery desired, the part being similarly threaded to receive it. The cup is preferably of a polygonal or similar shape as indicated at 3 for the purpose of being engaged by a wrench or other suitable tool for the purpose of securing or removing the cup on or from the parts of the machinery with which it is to be equipped. The cup is threaded at its upper inner end portion as indicated at 4, into which is secured the screw threaded end 5 of the cap 6. Secured within the cap at or near its periphery as indicated at 7 is a spring pin 8, which extends transversely across and beyond the periphery of the opposite side of the cap, the free end terminating preferably in a ring 9, the purpose of which will presently appear. The pin 8 is secured in the cap as indicated at 7 at an angle of slight degree relative to the plane of the under side of the cap so as to cause the free end of the pin to extend downwardly when in normal position, the free end of the pin being adapted to reciprocate within the slot 10 provided within the cap, and engage in the notch 11 of the cup when the cap is screwed downwardly in the cup and thereby lock the cap on the cup in the manner now about to be described.

My invention is operated as follows: The cap 6 is screwed downwardly within the cup 1 until the pin 8 engages within the notch 11, thereby preventing the cap from turning in either direction and securely locking the cap on the cup, whereby the cap is prevented from jarring loose or from off the cup. To remove the cap, the free end 9 of the pin 8 is lifted upward as to disengage the pin from the notch 11 when the cap may be readily unscrewed from off the cup, and the cup replenished with lubricant or for other purposes as may be desired.

It will be observed that I have provided a cup of the character described which is simple in its construction, cheap as to manufacture, as well as being simple in operation and effective as to the purpose intended.

Having fully described my invention, what I claim as new and desire to secure by Letters Patent, is;

A device of the character described, comprising a cup having a threaded upper portion and a notch in its upper edge, a threaded cap, having an open slot at one side, adapted to engage the upper end of said cup, and a spring pin, having one end secured within the cap and whose free end normally lies out of contact with the top wall of said slot, adapted for engagement with said notch in said cap, extended in alinement with said slot in said cap and beyond the periphery thereof, whereby it can be moved vertically in said slot to release it from said notch.

In testimony whereof I affix my signature in presence of two witnesses.

FRANK S. BROWN.

Witnesses:
E. WALTON BREWINGTON,
BROWN M. ALLEN.